United States Patent [19]

Olstowski et al.

[11] 4,154,716

[45] May 15, 1979

[54] FLUID RAPID-SETTING URETHANE COMPOSITIONS

[75] Inventors: Franciszek Olstowski, Freeport; Donald B. Parrish, Lake Jackson, both of Tex.

[73] Assignee: The Dow Chemical Company, Midland, Mich.

[21] Appl. No.: 571,669

[22] Filed: Apr. 25, 1975

Related U.S. Application Data

[63] Continuation-in-part of Ser. No. 246,903, Apr. 24, 1972, abandoned.

[51] Int. Cl.² ............................................. C08K 7/14
[52] U.S. Cl. .................................................. 260/37 N
[58] Field of Search ...................................... 260/37 N

[56] References Cited

U.S. PATENT DOCUMENTS

| | | | |
|---|---|---|---|
| 3,030,215 | 4/1962 | Veatch | 260/37 EP |
| 3,061,497 | 10/1962 | Wilson | 260/37 N |
| 3,136,732 | 6/1964 | Kaestner | 260/37 N |
| 3,464,935 | 9/1969 | Sepkoski | 260/37 N |
| 3,493,461 | 2/1970 | Sterman | 260/37 N |
| 3,669,920 | 6/1972 | Haggis | 260/37 N |
| 3,726,827 | 4/1973 | Jones | 260/31.8 N |
| 3,730,936 | 5/1973 | Bugmann | 260/37 N |
| 3,746,692 | 7/1973 | Olstowski | 260/77.5 MA |
| 3,801,532 | 4/1974 | Olstowski | 260/18 TN |

*Primary Examiner*—Paul R. Michl
*Attorney, Agent, or Firm*—J. G. Carter

[57] ABSTRACT

Fluid compositions containing a polyether polyol having an equivalent weight below about 250, a polyisocyanate, a solid modifier compound having a surface area less than 0.2 m²/gram and a particle size of less than 1/4 inch in the minimum dimension and a non-amine containing catalyst rapidly solidifies into a solid, dense polyurethane free of bubbles, distortions and fissures.

18 Claims, No Drawings

FLUID RAPID-SETTING URETHANE COMPOSITIONS

CROSS REFERENCE TO RELATED APPLICATION

This application is a continuation-in-part of application Ser. No. 246,903 filed Apr. 24, 1972, now abandoned.

This invention relates to fluid compositions which rapidly solidify into dense, rigid polyurethanes.

Rapid setting rigid polyurethanes are known and taught in U.S. Pat. No. 3,378,511 and in copending applications having serial numbers and filing dates of 179,149 filed Sept. 9, 1971; 195,498, filed Nov. 3, 1971 and 191,343 filed Oct. 21, 1971.

Each of these disclose rapid setting polyurethane compositions, but in each instance, a liquid modifier compound is employed.

The fluid rapid-setting compositions of the present invention comprise (A) a polyhydroxyl containing compound selected from
  (1) a polyether polyol having a hydroxyl functionality of from about 3 to about 8 and an OH equivalent weight of not greater than about 250,
  (2) a dihydroxyl containing compound having a hydroxyl equivalent weight of less than about 250,
  (3) mixtures thereof,
(B) an organic polyisocyanate,
(C) from about 20% to about 70% and preferably from about 25% to about 55% by weight based upon the combined weight of components A, B and C of a solid modifier compound having a surface area of less than about 0.2 m$^2$/gram and preferably less than about 0.1 m$^2$/gram and a decomposition and/or dehydration temperature above the exothermic reaction temperature of the fluid mixture, wherein said solid substance being essentially non-reactive with components A or B,
(D) from 0% to about 20% and preferably from about 5% to about 10% by weight based upon the combined weight of components A, B, C and D of a liquid modifier compound having a boiling point above 150° C.,
(E) from about 0.05% to about 5% and preferably from about 0.1% to about 2% by weight based upon the combined weight of components A and B of a non-amine containing catalyst for urethane formation, wherein components A and B are present in quantities so as to provide an NCO:OH ratio of from about 0.8:1 to about 1.5:1 and preferably from about 0.9:1 to about 1.2:1 and with the proviso that when component A is a dihydroxyl-containing compound, component B has an average NCO functionality at least about 2.5.

By the term rigid or non-elastomeric as used herein, it is meant that the compositions which when solidified or set have percent elongation values at the break point of less than 100 percent.

By the term solid as used herein, it is meant that the compositions when solidified or set have densities of at least 1 gram per cubic centimeter and are not foams.

The term rapid-setting as used herein means that the composition will rapidly solidify without the application of external sources of heat and can be removed from a mold within 5 minutes and preferably within 3 minutes from the time the reactants are mixed together. Upon removal from the mold; the products have sufficient strength to be handled and normally have sufficient strength to be employed for their intended purpose. However, the physical properties, if desired, in some instances may be improved by post curing at elevated temperatures.

The term essentially non-reactive with either components A or B means that any reaction, if any, does not extend the time required for solidification and the time within which such resultant casting can be demolded is not extended beyond about 5 minutes and preferably not beyond about 3 minutes and in many instances not beyond about 1 minute.

Suitable initiator compounds having from 3 to 8 hydroxyl groups which can be employed to prepare the polyols (component A-1) employed in the present invention include, for example, glycerine, trimethylolpropane, pentaerythritol, sorbitol, sucrose, mixtures thereof and the like.

Suitable vicinal epoxy compounds which can be reacted with the initiator compounds to prepare the polyols employed as component A in the present invention include, for example, the lower alkylene oxides and substituted alkylene oxides such as ethylene oxide, 1,2-propylene oxide, 1,2-butylene oxide, 2,3-butylene oxide, epichlorohydrin, epibromohydrin, epiodohydrin, styrene oxide, mixtures thereof and the like.

Suitable dihydroxyl-containing compounds having an OH equivalent wt. below about 250 which can be employed as component A-2 include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, epichlorohydrin, epibromohydrin, mixtures thereof and the like. When the dihydroxyl containing compound is a solid it is suitably employed by dissolving it in a suitable solvent selected from those compounds which are suitably employed as component D such as, for example, tri-n-butyl phosphate, triethyl phosphate and the like.

Suitable organic polyisocyanates which are employed as component B in the present invention include, for example, any organic polyisocyanate having 2 or more NCO groups per molecule and no other substituents capable of reacting with the hydroxyl groups of the compounds employed as component A. Suitable such polyisocyanate include, for example, 2,4-toluenediisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene ®W), naphthalene diisocyanate, dianisidine diisocyanate, polymethylene polyphenyl-isocyanate, mixtures of one or more polyisocyanates and the like.

Other organic polyisocyanates which are suitably employed and which are to be included in the term organic polyisocyanate include isocyanate terminated prepolymers prepared from the previously mentioned polyols and the above mentioned isocyanates.

Suitable polyisocyanates which can be employed as component B in the polyurethane compositions of the present invention also include those having an average NCO functionality of at least about 2.5 such as, for example, the polymethylene polyphenyl isocyanate, NCO-containing prepolymers such as the reaction products of an excess of an organic diisocyanate with polyhydroxyl containing compound having from 3 to about 8 OH groups per molecule such as, for example, glycerine, trimethylolpropane, pentaerythritol, sorbitol, sucrose, mixtures thereof and mixtures with dihydroxyl-containing compounds such that the average hydroxyl functionality of the mixture is at least about 2.5. It is preferred that the organic polyisocyanate be liquid. However, in the event that it is a solid or semisolid or of a relatively high viscosity such that blending with the other components would be difficult or inconvenient, they may be prepared in a suitable solvent selected from those compositions which are employed as component D herein and any quantity of such component D employed as a solvent for the polyisocyanate is included as a portion of the total quantity of component D employed in the rapid-setting composition. Suitable such solvents include, for example, trichlorobenzene, propylene carbonate and the like.

Suitable organic diisocyanates which are employed in the preparation of the prepolymers containing an average of at least 2.5 NCO groups include for example, 2,4-toluene-diisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene®W) naphthalene diisocyanate, dianisidine diisocyanate, mixtures of one or more polyisocyanates and the like.

The prepolymers employed as the polyisocyanate, component B, in the present invention have a % free NCO content of from about 8 to about 40 and preferably from about 12 to about 32 percent by weight.

Substances which are suitably employed as the solid modifier compound (component C) in the compositions of the present invention include any solid element, metallic and/or nonmetallic, compound or alloy which does not decompose at a temperature corresponding to the exotherm temperature resulting from the reaction between components A and B when the components comprising the present invention are blended together with the further proviso that such solid substance has a surface area of less than about 0.2 m$^2$/gram and preferably less than about 0.1 m$^2$/gram and a particle size such that the size of the particle in its minimum dimension is less than about ¼ inch i.e., it will pass through or can be aligned so as to pass through a ¼ inch square opening. In the case of woven or matted fibers, the individual fibers from which the woven or matted material is made must have a cross-section such that it could pass through a ¼ inch opening.

Suitable solid substances which are employed as the solid modifier (C) include, for example, metals such as aluminum, iron, copper, magnesium, silicon, nickel, zinc, lead, titanium, zirconium, alloys thereof such as, bronze, brass, ferrosilicon and the like, mixtures thereof and the like.

Compounds which are suitable as the solid modifier (C) include, for example, oxides of silicon, boron, iron, nickel, copper, tungsten, manganese, molybdenum, vanadium, lead, cobalt, chromium, zinc, mercury and cadmium, and nitrides of silicon, boron, aluminum, titanium, zirconium, mixtures thereof and the like.

Also included as suitable substances for use as component C are the carbides of silicon, boron, iron, tungsten, titanium, zirconium and sulfides of iron, copper, nickel, lead, zinc mercury and cadmium, mixtures thereof and the like.

Other substances which are suitably employed as the solid modifier, component C, include for example, organic substances such as crystalline waxes, solid granular pitches, bitumens, coal and rosins and such polymers as polyethylene, polypropylene, polystyrene, polyvinyl chloride, polymethyl methacrylate, granular polyurethanes, phenolic resins, polyamides, thermoset polyepoxides, alkyds, polytetrafluoroethylene, ABS polymers (acrylonitrile-butadiene-styrene) mixtures thereof and the like.

These particular solids may be irregular in shape or have particulate shapes that are spheres, rectangels, flakes, pellets or, they may be in the form of woven, or matted or fibers and the like. It is generally preferable that these particulate solids be blendable in the liquid polyol-polyisocyanate mix so that a liquid castable blend can be poured, or pumped into the desired mold, i.e. the mixture is fluid. However, it is also possible to pour or apply the liquid (precatalyzed) reactants over a layer or volume or surface of an aggregate of particulate solids or a web or layer of a porous mass of fibers (randomly placed, or aligned or woven or matted) or flakes. The restriction in this method is that the resulting resin-particulate solid composite structure must contain at least the minimum weight freaction (i.e. 20%) of the particulate solids.

When the solid substance employed as component C has a surface area substantially greater than about 0.2 in$^2$/gram the catalyzed mixture of polyol, polyisocyanate and solid modifier will yield a low density foam product.

The particulate solids to be incorporated into instant set polyurethane composite must be at least a weight fraction of about 20 weight percent of the mass of polyol plus polyisocyanate plus solid particulate modifier. Generally, about 25 weight percent to be 55 weight percent of the solid particulate modifier is incorporated in the composite system. The upper limit of the weight fraction of the solid modifiers may be that concentration which, if the solid modifier is preblended with the polyolpolyisocyanate mix, will still yield a fluid processable system. The upper limit concentration is then in turn affected by the density of the particulate solids (i.e., a high weight fraction (about 75%) lead (Pb) metal shot is liquid processable whereas granular quartz is not). The upper limit of a fluid processable mix of, say, beach sand (granular quartz) passing through 20 mesh and retained on 100 mesh screen plus a polyol such as a 260 molecular weight glycerine-propylene oxide adduct and a polyisocyanate such as TDI and in the absence of a supplemental liquid modifier is about 70 weight percent.

Suitable polyoxyalkylene compounds which can be employed as the liquid modifier compound (component D) include, for example, (1) a liquid, totally-capped or non-hydroxyl-containing block or randomly formed polyoxyalkylene glycol represented by the general formula

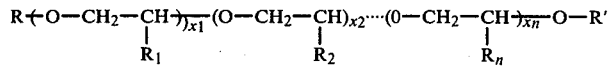

wherein R and R' are independently selected from saturated and unsaturated hydrocarbon groups having from about 1 to about 6, preferably from about 1 to about 3, carbon atom, $R_1, R_2, \ldots$ and $R_n$ are independently hydrogen, an aryl group, an alkyl group or haloalkyl group, said alkyl or haloalkyl group having from about 1 to about 2 carbon atoms with the proviso that when $R_1, R_2 \ldots R_n$ is a haloalkyl group, it is present in minor amounts i.e. a ratio of from about 0 to about 10 percent of the total $R_1, R_2 \ldots R_n$ groups, and $x_1, x_2, \ldots x_n$ are integers, such that the boiling point of the liquid capped polyalkylene glycol is above about 150° C., (2) a liquid, partially-capped block or randomly formed polyoxyalkylene glycol represented by the general formula

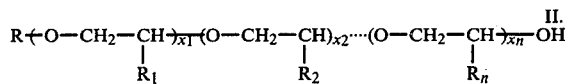
II.

where R and $R_1, R_2 \ldots R_n$ are as defined in formula I above and $x_1, x_2, \ldots x_n$ are integers, the sum of which provides the partially capped polyoxyalkylene compound with a molecular weight of at least about 700, (3) a liquid, block or randomly formed polyoxyalkylene glycol represented by the general formula

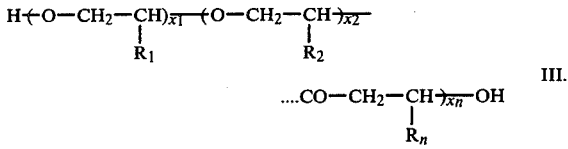
III.

wherein $R_1, R_2, \ldots R_n$ are as defined in formula I above and $x_1, x_2 \ldots x_n$ are integers, the sum of which provides the polyoxyalkylene glycol with an equivalent weight of at least about 700, and (4) a liquid, random or block polyoxyalkylene polyol having a hydroxyl functionality of from 3 to about 8 represented by the general formula

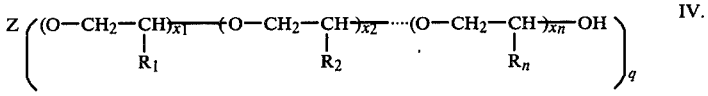
IV.

wherein $R_1, R_2 \ldots R_n$ are as defined in formula I above, Z is the residue of an initiator compound having from 3 to about 8 hydroxyl groups, $x_1, x_2, \ldots x_n$ are integers, the sum of which provides the polyoxyalkylene polyol with a hydroxyl equivalent weight of at least about 500 and q is an integer having a value of from 3 to about 8.

Suitable ester-modified polyoxyalkylene compounds which can be employed as the liquid modifier compound (component D) include, for example, those liquid ester-modified polyethers having a boiling point above about 150° C. represented by the general formula

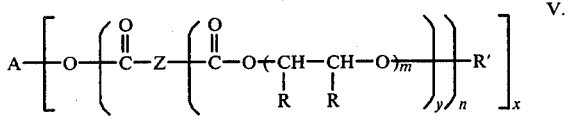
V.

wherein A is the residue of an initiator or starting compound having from 1 to about 8 hydroxyl groups, Z is the residue, excluding the carboxyl groups, of an internal anhydride of a saturated or unsaturated acyclic aliphatic, a saturated or unsaturated cyclic aliphatic, or aromatic polycarboxylic acid, halogenated derivatives thereof and mixtures thereof, each R is a substituent independently selected from hydrogen atoms, an alkyl radical having from 1 to 20 carbon atoms, a halomethyl radical, a phenyl radical, and a phenoxymethyl radical, an alkoxymethyl radical with the proviso that one of the R substituents must be hydrogen, R' is hydrogen or a saturated or unsaturated aliphatic group having from 1 to 20 carbon atoms, m has an average value of from about 1.0 to about 2.0, n has a value from about 1 to about 5, x has a value from about 1 to about 8 and y has a value of 1 or 2 and wherein said ester-modified polyether compound has a hydroxyl equivalent weight above about 500 when 3 or more hydroxyl groups are present and when 2 hydroxyl groups are present, an average equivalent weight of above about 700 and when zero or one hydroxyl group is present a molecular weight of above about 700.

Suitable initiators which can be employed to prepare the liquid polyoxyalkylene and ester-modified polyoxyalkylene modifier compounds (component D) of the present invention include compounds having from 1 to about 8 hydroxyl groups such as, for example, methanol, ethanol, propanol, butanol, ethylene glycol, propylene glycol, butylene glycol, 1,6-hexane diol, glycerine, trimethylolpropane, pentaerythritol, sorbitol, sucrose, mixtures thereof and the like.

When the liquid modifier compound, component D, is an ester modified polyether polyol, the initiator compound may also be and is preferably an adduct of the above mentioned initiator compounds and one or more of the following vicinal epoxide-containing compounds, i.e. the initiator compound is a polyoxyalkylene compound having 1 to 8 hydroxyl groups, preferably 2 to about 3 or 4 hydroxyl groups.

Suitable vicinal epoxide compounds which can be reacted with the above mentioned initiator compounds to prepare the modifier compounds (component D) employed in the present invention include, for example, ethylene oxide, 1,2-propylene oxide, 1,2-butylene oxide, 2,3-butylene oxide, epichlorohydrin, epibromohydrin, epiiodohydrin, styrene oxide, mixtures thereof and the like.

The liquid modifier compounds represented by formulae I–IV and methods for their preparation are well known in the art, e.g. U.S. Pat. No. 2,448,664, U.S. Pat. No. 2,425,755, U.S. Pat. No. 2,782,240 and U.S. Pat. No. 2,520,611. Methods for the preparation of the liquid modifier compounds represented by the formula V are given in a copending application Ser. No. 67,233, filed Aug. 26, 1970 by Robert W. McAda, Jr. for ESTER-MODIFIED POLYETHER POLYOLS and in U.S. Pat. No. 3,502,601.

Suitable aromatic compounds which are employed as the liquid modifier compound having a boiling point above about 150° C. (component D) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethyl-benzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and have boiling points at atmospheric pressure above about 150° C.

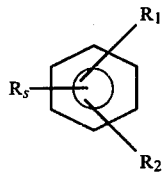

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which can be employed as the liquid modifier compound (component D) in the present invention include liquid multi-ring compounds having a boiling point above about 150° C. such as, for example, 1-chloro-naphthalene, 1-bromo-naphthalene, mixtures thereof and the like.

Suitable partially hydrogenated multi-ring aromatic compounds which can be employed as the liquid modifier compound (component D) in the present invention include, for example, 1,4-dihydronaphthalene, 1,2,3,4-tetrahydronaphthalene, mixtures thereof and the like.

Suitable organophosphorus compounds which can be employed as the liquid modifier compound, Component D, include, for example, organo phosphates, organo phosphites and organo phosphonates having boiling points above about 150° C.

Organo phosphates, phosphites and phosphonates which can be employed as the liquid modifier compound include those liquid compounds represented by the formulae

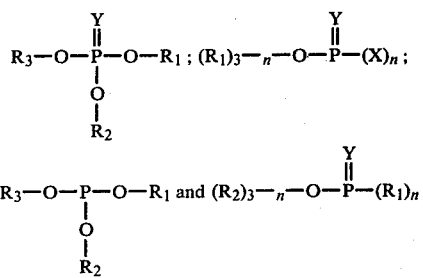

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, n has a value of 1 or 2. Suitable such compounds include, for example, tri-n-butyl phosphate, triethylphosphate, tricresylphosphate, tris-(beta-chloroethyl)phosphate, tris-(2,3-dibromopropyl)phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothiophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

The organo phosphorus compounds can be prepared by procedures described in ORGANO-PHOSPHORUS COMPOUNDS, G. M. Kosolapoff, John Wiley & Sons, Inc., 1950.

Suitable liquid organic carbonates which can be employed as the liquid modifier, component D, in the present invention include the acyclic and cyclic carbonates represented by the formulae

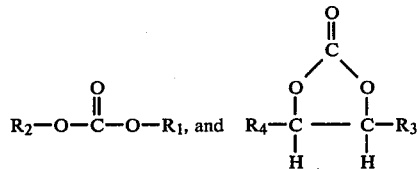

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which can be employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S. Pat. No. 2,687,425.

Suitable liquid cyclic organic carbonates include, for example, propylene carbonate, butylene carbonate, styrene carbonate, mixtures thereof and the like. The cyclic organic carbonates may be prepared in the manner described in Canadian Pat. No. 556,006.

Suitable cyclic polyethers which are employed as the liquid modifier (component D) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150° C. may be employed as the liquid modifier in the present invention including cyclic polyethers prepared from butylene oxide, epichlorohydrin and the like.

The liquid cyclic polyether modifier compounds can be prepared by procedures mentioned in CYCLIC POLYETHERS AND THEIR COMPLEXES WITH METAL SALTS by C. J. Pedersen, *J. Am. Chem. Soc.*, Vol. 89, p. 7017-7036, 1968, TWELVE-MEMBERED POLYETHER RINGS. THE CYCLIC TETRAMERS OF SOME OLEFIN OXIDES by R. S. Kern; *J. Org. Chem.*, Vol. 33, p. 388-390, 1968; British Pat. Nos. 785,229 and 1,108,921.

Suitable chlorinated aliphatic compounds having a boiling point above about 150° C. which are employed as the modifier compound in the present invention include, for example, such chlorinated aliphatic compounds as hexachlorobutadiene, tetrachlorobutadiene, 1,2,3,3-tetrachlorobutane, 1,2,3-trichloropropane, polyepichlorohydrin diol having an equivalent weight above about 700 up to about 4000, chlorinated paraffins, e.g. CHLOROWAX #40, 1-mercapto-3-chloropropanol-2, 3-chloropropane-1,2-diol, 2-chloropropane, 1,3-diol, 1,3-dichloro-2-propanol, mixtures thereof and the like.

Suitable cyclic sulfones which can be employed as the liquid modifier compound (component D) include the 5-membered cyclic sulfones such as, for example, 3-methylsulfolane (3-methyltetrahydrothiophene-1,1-dioxide) and the like.

Suitable esters of a carboxylic acid which can be employed as component D in the present invention include those esters prepared from mono- and polycarboxylic acids having from about 1 to about 20 carbon atoms such as for example, phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150° C. and is a liquid at room temperature.

These acid esters can be prepared by condensing an acid having from about 1 to about 20 carbon atoms with a saturated or unsaturated aliphatic alcohol having from about 1 to about 20 carbon atoms, with the proviso that the ester product is a liquid and has a b.p. greater than 150° C.

The term liquid modifier boiling above about 150° C. includes eutectic mixtures of the previously described classes of compounds which are solids at atmospheric pressure but said eutectic mixtures are a liquid at room temperature and atmospheric pressure which have boiling points above about 150° C. Also included in the definition are those solid compounds of the classes previously described which are dissolved in a liquid member of any of the described classes of compounds having boiling points above about 150° C. wherein the resultant solution is a liquid at standard conditions of temperature and pressure and have boiling points at atmospheric pressure above about 150° C.

Suitable non-amine-containing catalysts for urethane formation (component E) include, for example, organometal compounds of tin, zinc, lead, mercury, cadimum, bismuth, cobalt, manganese, antimony, iron and the like such as, for example, metal salts of a carboxylic acid having from about 2 to about 20 carbon atoms including, for example, stannous octoate, dibutyl-tin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

Suitable materials from which adequate molds, for casting the compositions of the present invention, may be prepared include polymers such as, for example, polyethylene, polypropylene, their copolymers and the like, polyurethanes, polysiloxane elastomers, Mylar ®, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactats may not be readily demolded unless the mold is preheated to about 50°-90° C., especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, game pieces, decorative objects, furniture or furniture components, gears or other machine components, threaded protective plugs and caps, and the like.

The following examples are illustrative of the present invention, but are not to be construed as to limiting the scope thereof in any manner.

EXAMPLES 1-15 AND COMPARATIVE EXPERIMENTS A-I

In each of the following examples all of the components were blended together except the catalyst (component E) when employed, which was subsequently blended into the mixture of the other components. Upon blending the catalyst, the resultant mixture was immediately poured into a polyethylene mold in the form of a cup or into a tray formed of Mylar ® film, as indicated. The components and characteristics of the casting were as indicated in the following table. In the following table, the following terms have the meaning:

Mold Type: PE= polyethylene cup, M = Mylar ® tray

Solidfication Time: Time required for mixture to turn from a fluid into a non-pourable solid measured from the time at which the catalyst, when employed, was added.

Demold Time: Time after catalyst addition at which the resultant casting could be removed from the mold and retain its shape.

| Composition And Results | Comparative Experiment A | Example 1 | Comparative Experiment B | Comparative Experiment C | Comparative Experiment D | Comparative Experiment E | Comparative Experiment F | Comparative Experiment G |
|---|---|---|---|---|---|---|---|---|
| Component A Type/grams | A/30 | A/30 | A/30 | A/30 | A/30 | A/30 | A/30 | A/30 |
| Component B | | | | | | | | |

-continued

|  | | | | | | | | |
|---|---|---|---|---|---|---|---|---|
| Type/grams | A/30 | A/30 | A/30 | A/30 | A/30 | A/30 | A/30 | A/30 |
| Component C | | | | | | | | |
| Type/grams | none | A/30 | A/6 | A/30 | B/30 | A/30 | none | A/30 |
| Surface Area, m²/g | | <0.1 | <0.1 | <0.1 | 142 | <0.1 | | <0.1 |
| Component D | | | | | | | | |
| Type/grams | none | none | none | none | none | none | none | none |
| Component E | | | | | | | | |
| Type/cc | A/0.7 | A/0.4 | A/0.4 | B/1.0 | A/0.4 | A[1]/0.008 | A/0.4 | B/0.4 |
| Mold Type | PE | PE | PE | PE | PE | PE | PE | PE |
| Solidification Time, Seconds | 20 | 15 | 12 | ca 180 | 20 | 150 | 20 | 90 |
| Demold Time, secs. | 120 | 25 | 120 | ca 240 | 60 | 240 | 180 | 240 |
| Density, g/cc | 0.4 | 1.34 | 0.67 | 0.53 | 0.035 | 0.52 | 0.44 | 0.64 |
| Tensile Strength, psi | ND[2] | ND | ND | ND | ND | ND | ND | ND |
| Elongation, % | ND | ND | ND | ND | ND | ND | ND | ND |
| Remarks | Casting Distorted & Developed Fissures | No Distortions or fissures | Swelled, distorted, & developed fissures | Expanded into a high den. foam | Coarse celled, low den. foam | Expanded to a high den. foam | Swelled, Distorted and cracked | Expanded into a high den. coarse-celled foam |

[1] 0.4 cc of a 2% solution by wt. of catalyst A in mineral spirits was employed.
[2] ND = Not determined.

| Composition And Results | Example 2 | Example 3 | Example 4 | Example 5 | Example 6 |
|---|---|---|---|---|---|
| Component A | | | | | |
| Type/grams | A/30 | A/100 | A/100 | A/30 | A/30 |
| Component B | | | | | |
| Type/grams | A/30 | A/100 | A/100 | A/30 | A/30 |
| Component C | | | | | |
| Type/grams | C/30 | D/200 | E/200 | F/120 | G/30 |
| Surface Area, m²/g | <0.2 | <0.15 | <0.2 | <0.1 | <0.2 |
| Component D | | | | | |
| Type/grams | none | none | none | none | none |
| Component E | | | | | |
| Type/cc | A/0.4 | A/0.4 | A/1.2 | A/1.0 | A/0.1 |
| Mold Type | PE | M | M | PE | PE |
| Solidification Time, Seconds | 20 | 30 | 30 | 12 | 25 |
| Demold Time, secs. | 60 | 60 | 45 | 25 | 45 |
| Density, g/cc | 2.2 | >1.5 | >1.5 | 2.47 | 1.04 |
| Tensile Strength, psi | ND | 5200 | 9800 | ND | ND |
| Elongation, % | ND | 3 | 4 | ND | ND |
| Remarks | | | No distortion or fissures | | |

| Composition And Results | Comparative Experiment H | Comparative Experiment I | Example 7 | Example 8 | Example 9 |
|---|---|---|---|---|---|
| Component A | | | | | |
| Type/grams | A/30 | A/33 | A/50 | A/30 | A/30 |
| Component B | | | | | |
| Type/grams | A/30 | A/33 | A/50 | A/30 | A/30 |
| Component C | | | | | |
| Type/grams | H/30 | G/10 | I/50 | J/150 | K/120 |
| Surface Area, m²/g | 0.33 | <0.2 | <0.2 | <0.1 | <0.1 |
| Component D | | | | | |
| Type/grams | none | none | none | none | none |
| Component E | | | | | |
| Type/cc | A/0.1 | A/0.1 | A/1.0 | A/1.0 | A/1.0 |
| Mold Type | PE | PE | M | PE | PE |
| Solidification Time, Seconds | 30 | 24 | 20 | 15 | 15 |
| Demold Time, secs. | 45 | 120 | 55 | 25 | 25 |
| Density, g/cc | 0.7 | 0.79 | 1 | 3.08 | 1.93 |
| Tensile Strength, psi | ND | ND | 5147 | ND | ND |
| Elongation, % | ND | ND | 7 | ND | ND |
| Remarks | swelled slightly | swelled slightly | | No Distortions of Fissures | |

| Composition And Results | Example 10 | Example 11 | Example 12 | Example 13 | Example 14 | Example 15 |
|---|---|---|---|---|---|---|
| Component A | | | | | | |
| Type/grams | A/60 | A/30 | A/26 | C/26 | A/30 | A/30 |
| Component B | | | | | | |
| Type/grams | A/60 | A/30 | A/30 | B/33 | C/46 | D/38 |
| Component C | | | | | | |
| Type/grams | L/160 | M/30 | N/40 | N/30 | N/50 | N/30 |
| Surface Area, | | | | | | |

-continued

| Composition and Results | | | | | | |
|---|---|---|---|---|---|---|
| m²g | <0.1 | <0.1 | 0.1 | 0.1 | 0.1 | 0.1 |
| Component D Type/grams | A/20 | none | none | none | none | none |
| Component E Type/cc | A/1.0 | A/0.6 | A/0.1 | C/1.0 | D/0.5 | A/1.0 |
| Mold Type | PE | PE | PE | PE | PE | PE |
| Solidification Time, Seconds | 40 | 20 | 25 | 105 | 45 | 120 |
| Demold Time, secs. | 60 | 60 | 45 | 120 | 65 | 135 |
| Density, g/cc | 1.7 | >1.0 | >1.5 | >1.2 | 1.5 | 1.4 |
| Tensile Strength, psi | ND | ND | ND | ND | ND | ND |
| Elongation, % | ND | ND | ND | ND | ND | ND |
| Remarks | No distortions or Fissures | | | | | |

| Composition And Results | Example 16 | Example 17 |
|---|---|---|
| Component A type/grams | A/55 | A/50 |
| Component B type/grams | A/55 | A/50 |
| Component C type/grams | O/55 | P/25.5 |
| surface area, m²/g | <0.2 | <0.2 |
| Component D type/grams | none | none |
| Component E type/cc | A/0.4 | A/0.2 |
| Mold Type | M | PE |
| Solidification Time, seconds | 30 | 45 |
| Demold Time, secs. | 120 | 120 |
| Density, g/cc | >1.0 | >1.0 |
| Tensile Strength, psi | 12,788 | — |
| Elongation, % | 8 | — |
| Barcol Hardness (#935 tester) | — | 95 |
| Remarks | | no distortion or fissures |

POLYOLS EMPLOYED AS COMPONENT A

Polyol A was the reaction product of glycerine with propylene oxide at a molar ratio of about 1:3 respectively and having a molecular weight of about 260.

Polyol B was the reaction product of glycerine with ethylene oxide in a molar ratio of about 1:3 respectively and having a molecular weight of about 225 and a % OH of 7.4.

Polyol C was the reaction product of pentaerythritol with propylene oxide in a molar ratio of about 1:5 respectively and having a molecular weight of about 304.

POLYISOCYANATES EMPLOYED AS COMPONENT B

Polyisocyanate A was an 80/20 mixture of the 2,4-, and 2,6-isomers of toluene diisocyanate.

Polyisocyanate B was xylylene diisocyanate having a % NCO of 44.6 and an NCO equivalent weight of 94.

Polyisocyanate C was a polymethylene polyphenyl isocyanate having an average functionality of about 2.6 and an NCO equivalent weight of 133.

SOLID SUBSTANCES EMPLOYED AS COMPONENT C

Solid A was a dry granular alumina passed through a 60 mesh U.S. Sieve Series screen (a particle size of about 0.1 mm) having a surface area of less than 0.1 m²/gram.

Solid B was a dry granular activated alumina having a surface area of about 142 m²/gram and a particle size of less than 0.1 mm commercially available from Aluminum Co. of America as ALCOA A-1.

Solid C was dry granular iron having a surface area of less than 0.2 m²/gram and a particle size of greater than 0.3 mm.

Solid D was dry granular quartz having a surface area of about 0.15 m²/gram and a particle size of about greater than 0.1 mm (material passed through a 30 mesh and retained on a 100 mesh U.S. Sieve Series screen.

Solid E was dry granular marble which passed through a 100 mesh U.S. Sieve Series screen having a surface area of less than 0.2 m²/gram.

Solid F was dry granular bronze powder having a surface area of less than 0.1 m²/gram.

Solid G was dry polyethylene powder having a surface area of less than 0.2 m²/gram and a particle size in a minimum direction of 0.4 mm.

Solid H was dry powdered polyethylene having a surface area of 0.33 m²/g.

Solid I was a dry copolymer vinyl chloride and vinylidene chloride (Saran 324) commercially available from The Dow Chemical Company) having a surface area of less than 0.2 m²/gram.

Solid J was dry granular nickel powder having a surface area of less than 0.1 m²/gram.

Solid K was dry granular aluminum spheres having a surface area of less than 0.1 m²/gram.

Solid L was dry granular silicon carbide having a surface area of 0.1 m²/gram.

Solid M was dry polystyrene granules having a surface area of less than 0.1 m²/gram.

Solid N was granular silica having a surface area of 0.1 m²/gram.

Solid O was milled glass fibers having an average length of less than about 1/16″ (1.6 mm) and a surface area of <0.2 g/m² commercially available from Owens-Corning as #709 fibers.

Solid P was a mixture of chopped glass fibers consisting of 25.5 wt. % of ½" long (12.7 mm) and 74.5 wt. % of ¼" long (6.35 mm) Owens-Corning #K885 glass fibers.

LIQUIDS EMPLOYED AS COMPONENT D

Liquid A was trichlorobenzene.
Liquid B was dioctylphthalate.

CATALYSTS EMPLOYED AS COMPONENT E

Catalyst A was a commercially available lead octoate containing 24% by weight of lead.

Catalyst B — was a 33⅓% by weight solution of triethylenediamine in dipropylene glycol.

Catalyst C was a commercially available mercury naphthenate containing 25% by weight Hg.

Catalyst D was a commercially available stannous octoate solution.

EXAMPLE 18

Employing the mixing procedure of the previous examples, a composition consisting of
  20 parts by weight of Polyol A
  20 parts by weight of Polyisocyanate A
  1 part by weight of a 5% by weight solution of commercial lead octoate catalyst containing 24% by weight lead
was poured over a double folded tight knit piece of woven glass cloth amounting to 17 parts by weight and a glass loading of 0.51 grams per in². The fiber structure was thoroughly wetted as the liquid reagents passed through the fiber structure and suddenly solidified within about 15 seconds after catalyst addition and was removed from the mold within 40 seconds after catalyst addition thereby producing a composite sheet containing 29% by weight of glass fiber and having a density of greater than 1 gram/cc.

We claim:

1. A process for producing solid, non-elastomeric polyurethane articles having a density of at least 1 g/cc, a percent elongation of less than 100, and which can be demolded within a period of about 5 minutes without the addition of an external source of heat which process comprises:
  (1) admixing the components of a fluid composition comprising
    (A) a polyhydroxyl-containing compound selected from
      (1) a polyether polyol having a hydroxyl functionality of from about 3 to about 8 and an OH equivalent weight of not greater than about 250,
      (2) a dihydroxyl-containing compound having a hydroxyl equivalent weight of less than about 250, and
      (3) mixtures thereof,
    (B) an organic polyisocyanate,
    (C) from about 20% to about 60% by weight of the combined weight of Components (A), (B) and (C) of, as the sole modifier, a solid modifier substance having a surface area of less than about 0.2 m²/gram, a particle size in the minimum dimension of less than about ¼ inch, wherein such solid modifier compound is essentially non-reactive with components (A) or (B),
    (D) from about 0.05% to about 5% by weight of the combined weight of Components (A) and (B) of a non-amine containing catalyst for urethane formation, wherein components (A) and (B) are present in quantities so as to provide an NCO:OH ratio of from about 0.8:1 to about 1.5:1 with the proviso that when Component (A) is a dihydroxyl-containing compound, Component (B) has an average NCO functionality of greater than about 2.5;
  (2) placing the admixed composition into a suitable mold wherein said composition solidifies within less than about 5 minutes to a solid having the aforesaid density and elongation; and
  (3) subsequently demolding the resultant article from the mold.

2. The process of claim 1 wherein Component (C) is present in a quantity of from about 25 to about 55% by weight, Component (D) is present in a quantity of from about 0.1 to about 2% and wherein components (A) and (B) are present in quantities such that the NCO:OH ratio is from about 0.9:1 to about 1.2:1.

3. The process of claim 2 wherein Component (C) has a surface area of less than about 0.1 m²/gram.

4. The process of claim 3 wherein Component (A) has an average functionality of 3 and Component (B) is an organic diisocyanate.

5. The process of claim 4 wherein Component (A) is the reaction product of glycerine and propylene oxide in a molar ratio of about 1:3 respectively, and Component (B) is toluene diisocyanate.

6. The process of claim 3 wherein Component (C) is in particulate form.

7. The process of claim 2 wherein Component (C) is in fibrous form.

8. The process of claim 2 wherein Component (C) is in woven or mat form.

9. The process of claim 7 wherein said fibers are ≦½ inch in length.

10. The process of claim 9 wherein said fibers are glass fibers.

11. The process of claim 1 wherein said mold is in the form of a machine component.

12. The process of claim 1 wherein said mold is in the form of a furniture component.

13. The process of claim 1 wherein said mold is in the form of a decorative object.

14. The process of claim 1 wherein Component (D) is an organo metal compound selected from the group of metals consisting of tin, zinc, lead, mercury, cadmium, bismuth, cobalt, manganese, antimony, iron and mixtures thereof.

15. The process of claim 14 wherein Component (D) is a metal salt of a carboxylic acid having from about 2 to about 20 carbons.

16. The process of claim 15 wherein Component (D) is selected from the group consisting of stannous octoate, dibutyltin dilaurate, dibutyltin diacetate, ferric acetylacetonate, lead octoate, lead oleate, phenylmercuric propionate, cobalt naphthenate, lead naphthenate and mixtures thereof.

17. The process of claim 7 wherein said fibers are <¼ inch in length.

18. The process of claim 7 wherein said fibers are <1/16 inch in length.

* * * * *

UNITED STATES PATENT AND TRADEMARK OFFICE
CERTIFICATE OF CORRECTION

PATENT NO. : 4,154,716

DATED : May 15, 1979

INVENTOR(S) : Franciszek Olstowski and Donald B. Parrish

It is certified that error appears in the above-identified patent and that said Letters Patent are hereby corrected as shown below:

Column 2, line 47; change "polyisocyanate" to --polyisocyanates--.

Column 5, line 2; change "atom" to --atoms--.

Column 5, line 29; change "····CO-$CH_2$-CH$)_{x_n}$-OH" 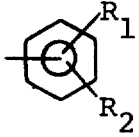

to --····(O-$CH_2$-CH$)_{x_n}$-OH--.

Column 7, line 23; change "$R_s$-⬡-$R_1$, $R_2$"

to -- $R_3$-⬡-$R_1$, $R_2$ --. 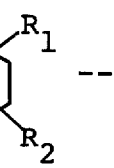

Column 9, line 11; change "1,2,3-trichloropropane," to --1,2,3-trichloropropene--.

Column 10, line 23; change "reactats" to --reactants--.

UNITED STATES PATENT AND TRADEMARK OFFICE
CERTIFICATE OF CORRECTION

PATENT NO. : 4,154,716            PAGE 2 of 2

DATED : May 15, 1979

INVENTOR(S) : Franciszek Olstowski and Donald B. Parrish

It is certified that error appears in the above–identified patent and that said Letters Patent are hereby corrected as shown below:

Column 10, line 54; change "Solidfication" to --Solidification--.

Column 11, line 16 of the third table under Compositions and Results; change "Solidfication" to --Solidification--.

Column 11, line 22 of the third table between Example 8 and Example 9; change "No Distortions of Fissures" to --No Distortions or Fissures--.

Signed and Sealed this

Twenty-fifth Day of September 1979

[SEAL]

Attest:

LUTRELLE F. PARKER

*Attesting Officer*        *Acting Commissioner of Patents and Trademarks*